(12) United States Patent
Flint et al.

(10) Patent No.: US 7,339,763 B2
(45) Date of Patent: Mar. 4, 2008

(54) DISK DRIVE THIN-FILM INDUCTIVE WRITE HEAD WITH POLE TIP STRUCTURE HAVING REDUCED SUSCEPTIBILITY TO CORROSION

(75) Inventors: Eric Wayne Flint, San Jose, CA (US); Wen-Chien David Hsiao, San Jose, CA (US); Yiping Hsiao, San Jose, CA (US); Michael Ming Hsiang Yang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 477 days.

(21) Appl. No.: 11/073,267

(22) Filed: Mar. 4, 2005

(65) Prior Publication Data

US 2006/0198048 A1 Sep. 7, 2006

(51) Int. Cl.
*G11B 5/147* (2006.01)
*G11B 5/187* (2006.01)

(52) U.S. Cl. ...................... 360/126; 360/122
(58) Field of Classification Search ........... 360/114.06, 360/126, 317, 125, 119, 120, 122
See application file for complete search history.

(56) References Cited

U.S. PATENT DOCUMENTS

| | | | |
|---|---|---|---|
| 5,126,907 A | 6/1992 | Hamakawa et al. | |
| 5,224,002 A | 6/1993 | Nakashima et al. | |
| 5,606,478 A * | 2/1997 | Chen et al. | ................. 360/126 |
| 5,739,991 A | 4/1998 | Matono et al. | |
| 5,831,801 A | 11/1998 | Shouji et al. | |
| 5,864,450 A | 1/1999 | Chen et al. | |
| 5,867,890 A * | 2/1999 | Hsiao et al. | .............. 29/603.14 |
| 6,033,580 A * | 3/2000 | Shouji et al. | ................. 216/22 |
| 6,243,939 B1 * | 6/2001 | Chen et al. | .............. 29/603.14 |
| 2002/0089496 A1* | 7/2002 | Numao | ....................... 345/204 |
| 2002/0154443 A1* | 10/2002 | Kawasaki et al. | .......... 360/126 |
| 2003/0179497 A1* | 9/2003 | Harris et al. | ................. 360/126 |
| 2003/0179498 A1* | 9/2003 | Hsiao et al. | ................. 360/126 |
| 2004/0252410 A1* | 12/2004 | Hsu et al. | .................... 360/126 |

OTHER PUBLICATIONS

Schedule of "K2—Seventh International Symposium on Magnetic Materials, Processes and Devices" Oct. 20-25, 2002. www.electrochem.org/dl/ma/202/symposia/pik2.htm.*

(Continued)

*Primary Examiner*—William Klimowicz
*Assistant Examiner*—Adam B Dravininkas
(74) *Attorney, Agent, or Firm*—Thomas R. Berthold

(57) ABSTRACT

A disk drive thin-film write head has a first ferromagnetic pole tip that includes a pedestal pole layer and a capping layer on the pedestal pole layer. A substantial portion of the pedestal pole layer is formed of a lower-moment alloy and the capping layer is formed of a higher-moment alloy and is made thick enough to compensate for the lower-moment alloy in the pedestal pole layer. The pedestal pole layer may be a bilayer of two different NiFe alloys with the upper layer in the bilayer having a higher moment, and the capping layer may be a CoFe alloy. The width of the pedestal pole layer is substantially reduced to reduce the pole tip area exposed. The reduced pole tip area and the increased use of lower-moment alloys enable a thinner protective film to be used to protect the pole tips from corrosion.

3 Claims, 4 Drawing Sheets

OTHER PUBLICATIONS

Bonhote, C.; Lam, J; Last, M. "Properties of DC plated 2.4 tesla CoFe alloys." K2—Seventh International Symposium on Magnetic Materials, Processes and Devices. Oct. 20-25, 2002.*

Bonhote, Christian; Cooper, Emanuel I.; Romankiw, Lubonyr T.; Xu, Hong. "Electroplated 2.4 Tesla CoFe films." K2—Seventh International Symposium on Magnetic Materials, Processes and Devices. Oct. 20-25, 2002.*

* cited by examiner

DISK DRIVE THIN-FILM INDUCTIVE WRITE HEAD WITH POLE TIP STRUCTURE HAVING REDUCED SUSCEPTIBILITY TO CORROSION

BACKGROUND OF THE INVENTION

1. Field of the Invention

This invention relates in general to a thin-film inductive write head for magnetic recording disk drives, and more particularly to a write head with an improved pole tip structure.

2. Description of the Related Art

In a magnetic recording disk drive, data is written by thin film magnetic transducers called "write heads" that are maintained over the surface of the disk while the disk is rotated at high speed. Each write head is located on the end face of a head carrier or slider that is at least partially supported by a thin cushion of air (an "air bearing") produced by the disk's high rotational speed. The surface of the slider that faces the disk is called the air-bearing surface (ABS) and the end face on which the write head is located is generally perpendicular to the ABS.

The write head has ferromagnetic pole pieces with pole tips that are exposed at the ABS. A nonmagnetic write-gap layer is located between the pole tips and an electrical coil structure is located between the pole pieces. When write current is passed through the coils a magnetic write field is induced at the pole tips across the write gap to magnetize or "write" regions of the recording layer on the disk.

A protective film, typically sputter-deposited carbon on an adhesion film, is formed on the ABS to protect the pole tips from corrosion. As the need for disk drives with higher data storage capacity has increased, the areal recording density of the disks has increased. This has led to the need for higher-moment ferromagnetic materials for the pole pieces, especially the pole tips, and for reduced magnetic spacing between the pole tips and the recording layer of the disk. However, higher-moment ferromagnetic materials have a higher film stress which can cause cracking of the protective film and thus corrosion of the pole tips. Thus the use of higher-moment ferromagnetic materials in the pole tips requires a thicker protective film which undesirably increases the magnetic spacing.

What is needed is a thin-film inductive write head with a pole tip structure that has the desired higher-moment ferromagnetic material but without the undesired thicker protective film.

SUMMARY OF THE INVENTION

The invention is a write head with an improved pole tip structure. The write head has a first pole tip that includes a pedestal pole layer and a capping layer on the pedestal pole layer. The capping layer has an extension and the write gap is located between the capping layer extension and the second pole tip. At the disk-facing surface, e.g., the air-bearing surface (ABS) of a slider, the capping layer extension, the edge of the write gap and the second pole tip are all substantially coplanar and have the same width, which defines the track width (TW) of the data written in the recording layer of the disk. In one embodiment, substantially the entire thickness of the pedestal pole layer is formed of a lower-moment ferromagnetic alloy, such as NiFe wherein the ratio of Ni to Fe is between about 40/60 and 50/50, and the capping layer is formed of a higher-moment ferromagnetic material and is made thick enough to compensate for the lower-moment material in the pedestal pole layer. In a second embodiment, the pedestal pole layer is a bilayer of two different ferromagnetic alloys formed as a first pedestal pole layer with a lower moment and a second pedestal pole layer with a higher moment, with the thickness of the first pedestal pole layer making up at least 50 percent of the total thickness of the bilayer. In both embodiments the width of the pedestal pole layer is substantially reduced to less than about 50 times TW.

In both embodiments, the thickness of the protective film over the pole tips is substantially reduced, typically to thicknesses between about 1.5 and 5 nm. This is because a significant portion of the higher-moment material, with its high film stress, has been replaced with lower-moment material that causes substantially less cracking of the protective film, and because the total pole tip area exposed at the ABS has been substantially reduced by reduction of the width of the pedestal pole layer. As a result, the magnetic spacing between the pole tips and the recording layer of the disk can be reduced, which means that the strength of the write field can be reduced.

For a fuller understanding of the nature and advantages of the present invention, reference should be made to the following detailed description taken together with the accompanying figures.

DETAILED DESCRIPTION OF THE INVENTION

Figure 1:
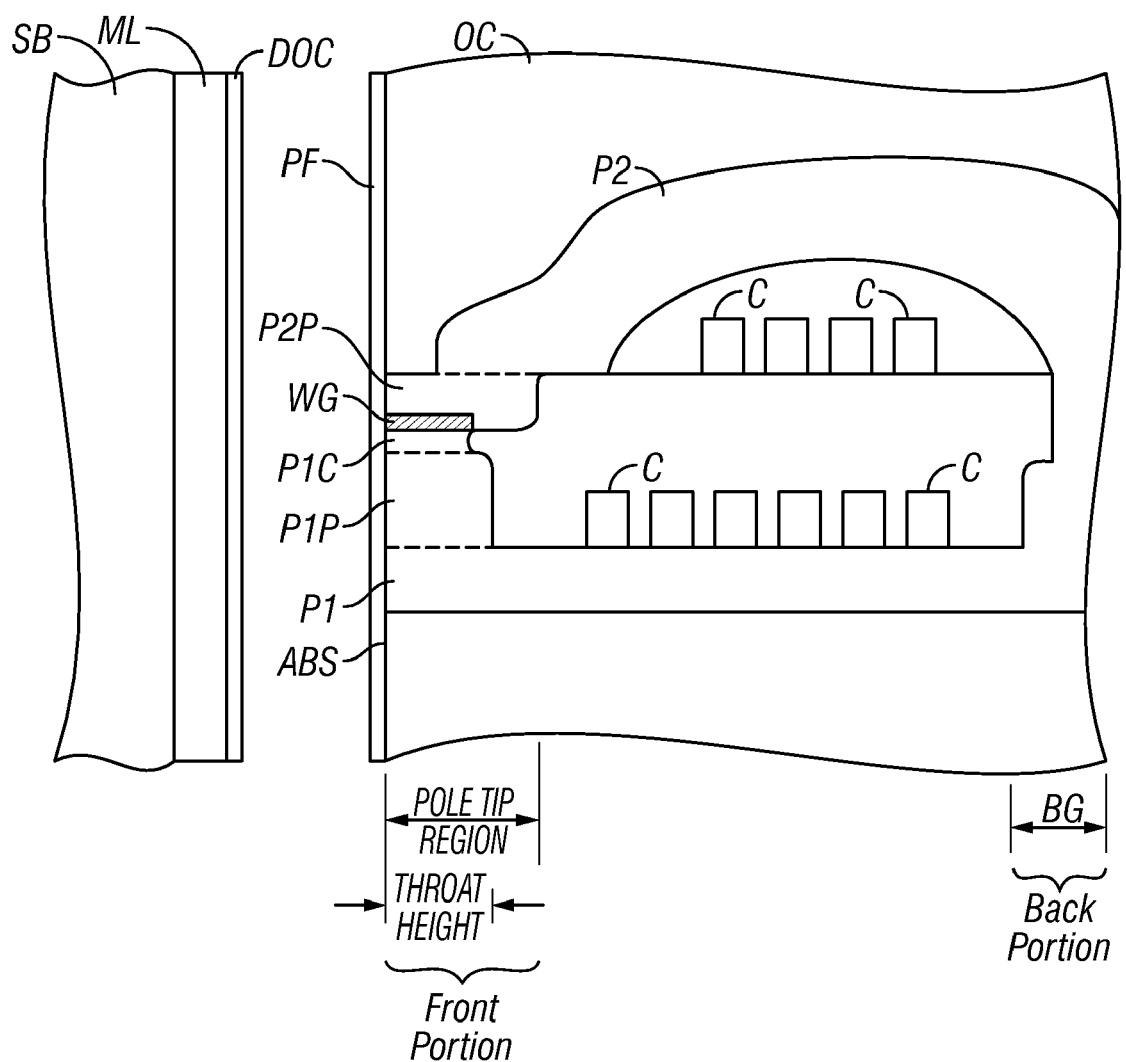
FIG. 1 is a side sectional view that depicts generally both a prior art thin-film inductive write head structure and the write head structure of the present invention, showing the write head pole tips facing a magnetic recording disk.
Figure 2:
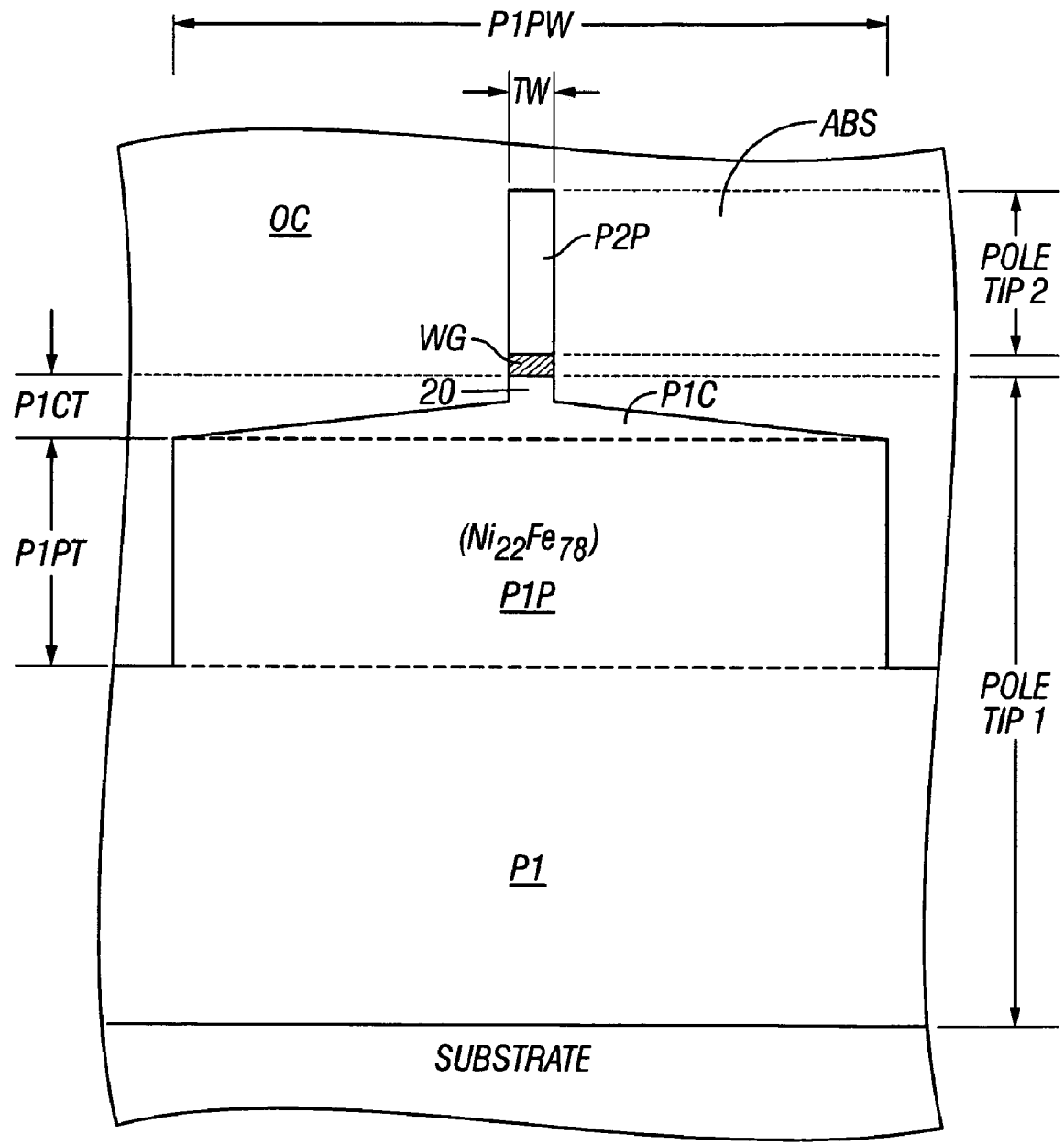
FIG. 2 is a partial end view, as seen from the disk, of the pole tip structure of a prior art write head structure like that depicted in FIG. 1.

A thin-film inductive write head structure is shown in the side sectional view of FIG. 1 and the partial end view, as seen from the disk, of FIG. 2. The more general FIG. 1 depicts both the prior art write head and the write head of the present invention, while the more detailed FIG. 2 depicts the prior art write head. The write head is formed on a substantially planar substrate, which is typically the end face of the disk drive's head carrier, typically an air-bearing slider. The slider has a disk-facing surface, the air-bearing surface (ABS), that contains a protective film (PF) to protect elements of the write head that are exposed at the ABS from corrosion. FIG. 1 also depicts the write head pole tips at the ABS and facing a magnetic recording disk that has a magnetic layer (ML) on the disk substrate (SB) and a protective disk overcoat (DOC) on the ML. The write head includes a coil C located between a lower pole piece (comprising first or lower pole layer P1, a pedestal pole layer P1P and a capping layer P1C), and an upper pole piece (comprising second pole tip P2P and second pole layer P2). The pole pieces are formed from thin films or layers of ferromagnetic material. The front portion or pole tip region of the pole pieces have a pole tip height dimension commonly called the "throat height". The throat height is measured between the ABS, formed by polishing the tips of the pole pieces, and the inner edge of pedestal pole layer P1P.

The write head also has a back portion or back gap (BG) region where the pole pieces are connected together. The upper or second pole piece has a pole tip P2P in the pole tip region and the lower or first pole piece has a pole tip formed of the front portion of P1, the pedestal pole layer P1P and the capping layer P1C, all located in the pole tip region. The pole layer P1 is deposited on a generally planar substrate, which is typically the end face of the air-bearing slider. The disk drive's magnetoresistive (MR) read head (not shown) and the shields (not shown) for the MR head are also formed on the end face of the slider, but typically below the write head. In one type of read/write head, called a "merged" head, the lower pole layer P1 also functions as one of the MR shields.

The second pole tip P2P and the P1C portion of the first pole tip are separated by a write gap layer WG, which is a thin layer of nonmagnetic material, e.g., a nonmagnetic metal or metal alloy such as Rh or NiCr, or an insulating material such as alumina ($Al_2O_3$). During the write process, write currents are sent to the coil C and a magnetic field is generated across the write gap WG. The fringing field from the write gap WG is used to reverse the magnetization in the magnetic layer ML, resulting in the recording of data on the disk.

As shown in FIGS. 1 and 2, the ends of the pole tips and the front edge of WG are all substantially coplanar with the ABS. As shown in detail in FIG. 2, the width of the pole tip P2P, the gap layer WG and the extension 20 of P1C in a direction generally parallel to the substrate surface determine the width of the data track on the disk (the track width or TW). In the prior art write head as shown in FIG. 2, the pedestal pole layer P1P has a thickness P1PT and a width, in the direction parallel to TW, of P1PW. In the prior art, the entire thickness of P1P is typically formed of a high-moment material, such as $Ni_{20}Fe_{80}$, and P1PW is typically about 100 times as wide as TW (i.e., the ratio P1PW/TW is about 100). The capping layer P1C is typically an alloy with a higher moment than the alloy of P1P, such as CoFe, with a thickness P1CT about 10 percent of the thickness of P1P. P2P is also typically formed of a high moment material, such as $Ni_{20}Fe_{80}$. Typical dimensions are about 0.25 μm for TW, 25 μm for P1PW, 3.2 μm for P1PT and 0.30 μm for P1CT.

Ferromagnetic materials used in write heads are typically characterized by the strength of the magnetic field, or magnetic flux density, measured in Tesla (T), that the material is capable of producing. Generally, the higher the magnetic moment of the ferromagnetic material, the higher the magnetic flux density. For example, $Ni_{45}Fe_{55}$ has a magnetic flux density of about 1.6 T, $Ni_{20}Fe_{80}$ has a magnetic flux density of about 2.2 T and $Co_{32}Fe_{68}$ has a magnetic flux density of about 2.4 T.

The write head is fabricated using well-known processes. The layers P1 and P1P are typically formed by electroplating into a trench patterned on the substrate by a resist pattern. The P1C and WG layers are sputter deposited onto P1P and the P2 layer is electroplated onto the WG layer. The shape of the pole tips with desired dimensions, such as TW and P1PW, are formed by ion milling or reactive-ion-etching (RIE) through a mask. The overcoat (OC), typically alumina, is then sputter deposited over the completed write head structure.

The high-moment NiFe ferromagnetic alloy (typically NiFe wherein the ratio of Ni to Fe is between about 15/85 and 25/75) used for P1P and the relatively large surface area that P1P presents at the ABS require that the protective film PF (FIG. 1) be relatively thick to protect the pole tips, especially P1P, from corrosion. The PF maybe a single layer, but is typically a bilayer of an outer film formed on an adhesion film. The typical adhesion film is silicon and the typical outer film is sputter-deposited amorphous diamond-like carbon (DLC), such as tetrahedral amorphous carbon (ta-C) or tetrahedral amorphous hydrogenated carbon (ta-C: H). The high-moment NiFe materials have relatively high film stress which can cause cracking of the PF film if the PF film is not thick enough. The requirement of a thick PF increases the magnetic spacing between the pole tips and the ML of the disk, as depicted in FIG. 1, which means that a stronger magnetic write field is required.

Figure 3:
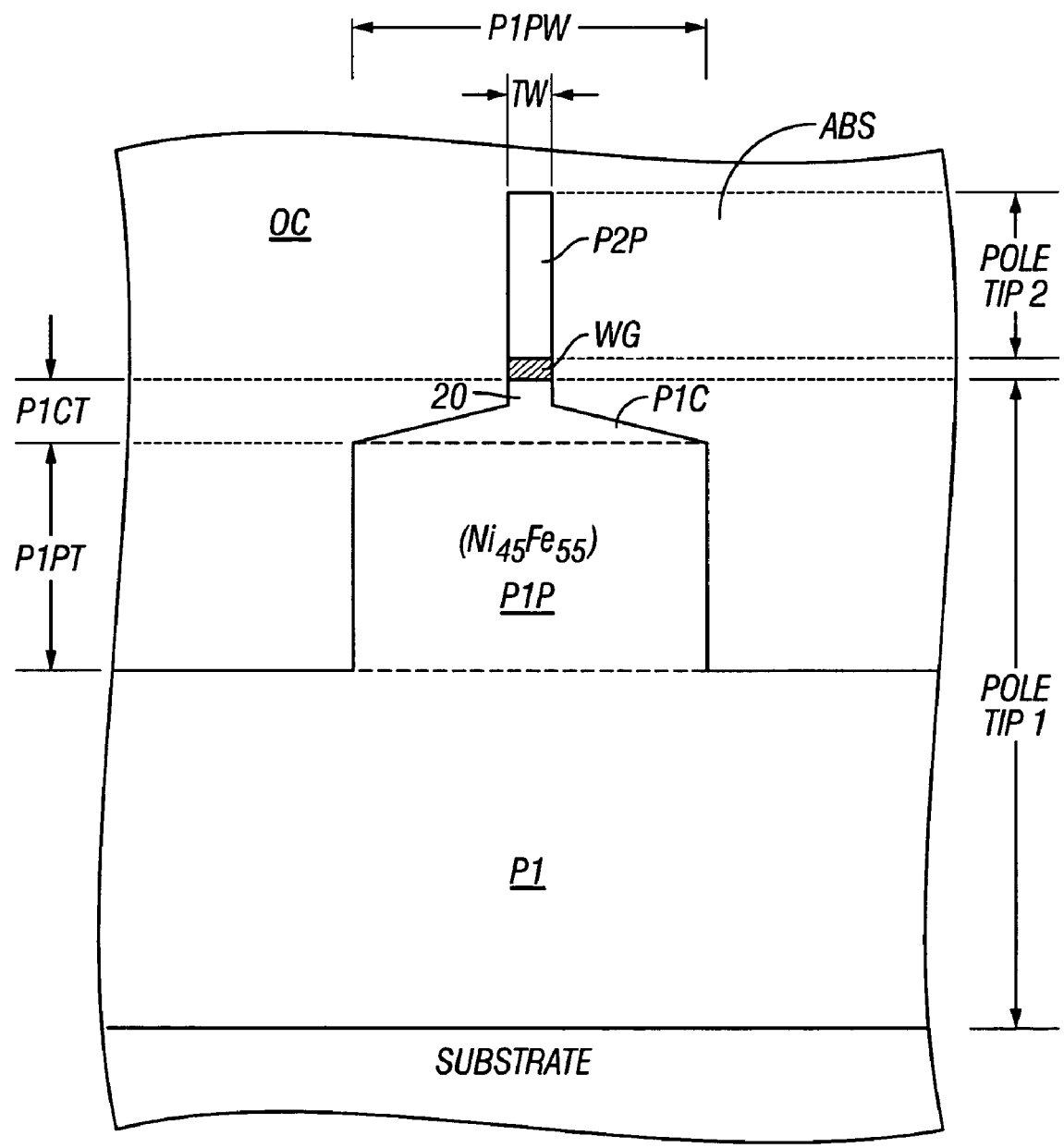
FIG. 3 is a partial end view, as seen from the disk, of the pole tip structure of a first embodiment of the write head structure of the present invention.
Figure 4:
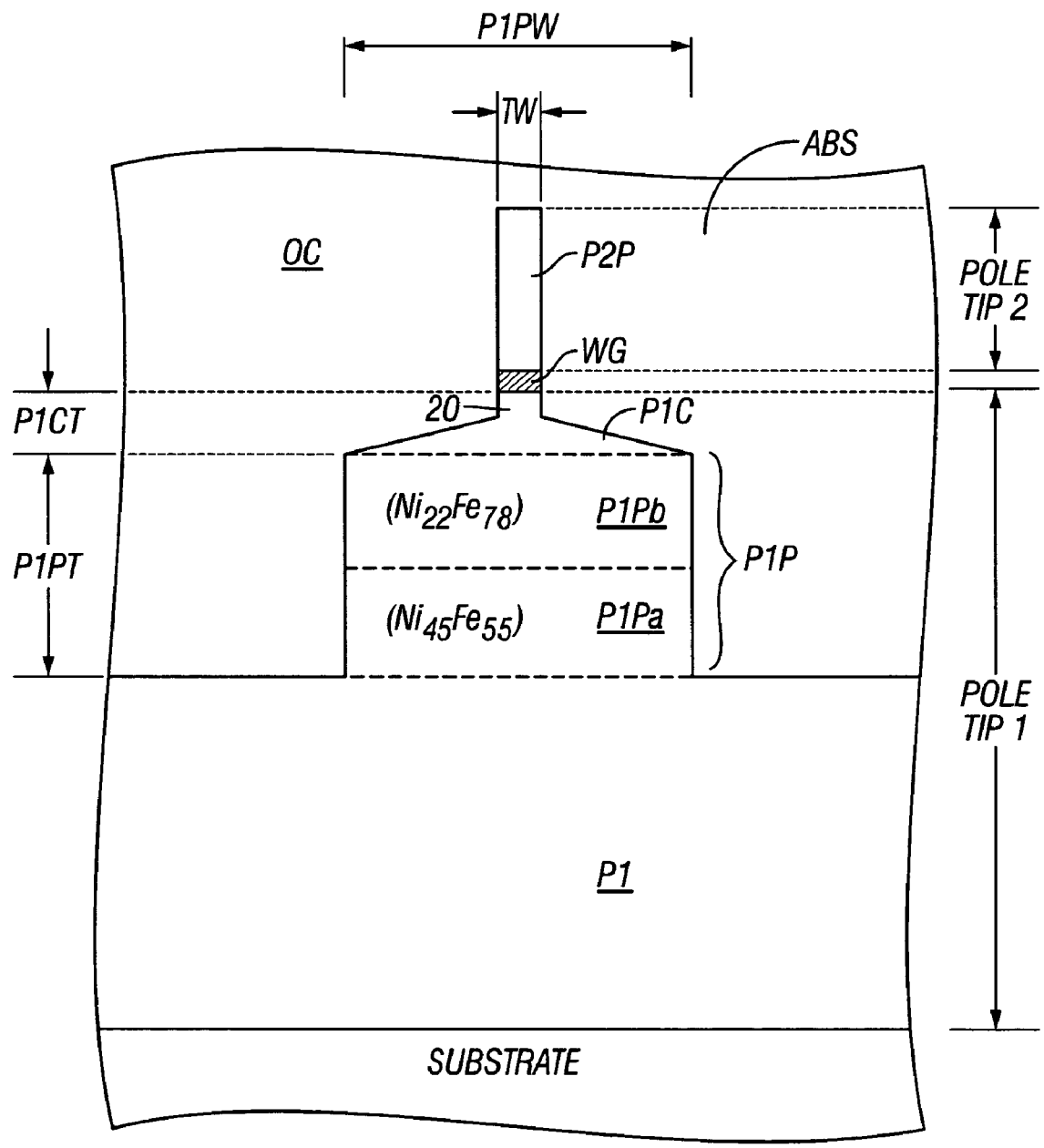
FIG. 4 is a partial end view, as seen from the disk, of the pole tip structure of a second embodiment of the write head structure of the present invention.

The write head of the present invention is substantially as depicted in FIG. 1, but has the structure and composition as shown in FIG. 3 for a first embodiment, and as shown in FIG. 4 for a second embodiment. In FIG. 3 substantially the entire thickness of P1P is formed of a lower-moment ferromagnetic alloy, such as NiFe wherein the ratio of Ni to Fe is between about 40/60 and 50/50. In addition, P1PW is substantially smaller so that the ratio P1PW/TW is less than about 50. The thickness P1CT of the high-moment (typically about 2.4 Tesla) capping layer P1C is increased to compensate for loss of the high-moment material in P1P. In one example, P1PT is about 3.0 μm and P1CT is about 0.5 μm.

In the second embodiment as shown in FIG. 4, P1P is a bilayer of two different ferromagnetic alloys formed as a first pedestal pole layer P1Pa and a second pedestal pole layer P1Pb on P1Pa. P1Pa is formed of a lower-moment ferromagnetic alloy and P1Pb is formed of a higher-moment ferromagnetic alloy. P1Pa has a thickness at least 50 percent of the total thickness P1PT, with the thickness of P1Pb being at least about 10 percent of the total thickness P1PT. The bilayer pedestal pole layer may also have a reduced width P1PW, like the width of P1P in the first embodiment of FIG. 3. The thickness of the capping layer P1C is substantially the same as in the prior art of FIG. 2, but optionally may be made thicker. In one example, P1Pa is $Ni_{45}Fe_{55}$ with a thickness of about 2.7 μm and P1Pb is $Ni_{20}Fe_{80}$ with a thickness of about 0.5 μm.

With either embodiment, the thickness of PF can be substantially reduced. This is because a significant portion of the high-moment material, with its high film stress, has been replaced with lower-moment material that causes substantially less cracking of PF. In addition, the total pole tip area exposed at the ABS has been substantially reduced, by reduction of the width of P1PW. As a result, the magnetic spacing between the pole tips and the ML of the disk can be reduced, which means that the strength of the write field can be reduced. With the write head embodiments of the present invention, if the PF is DLC over silicon, the thickness of the PF can be safely reduced to less than about 5 nm, to within a range of about 1.5 nm to about 5 nm, with the preferred thickness being no greater than about 2 nm.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive thin-film inductive write head structure comprising:

a slider having a disk-facing surface and an end face substantially perpendicular to the disk-facing surface;

a thin-film inductive write head formed on the end face of the slider and comprising (a) a first ferromagnetic pole piece comprising a first pole layer (P1), a first pedestal pole layer (P1Pa) on P1 and formed of a ferromagnetic alloy comprising Ni and Fe wherein the ratio of Ni to Fe in P1Pa is between about 40/60 and 50/50, a second pedestal pole layer (P1Pb) on P1Pa and formed of a ferromagnetic alloy comprising Ni and Fe, wherein the ratio of Ni to Fe in P1Pb is between about 15/85 and 25/75, and having a thickness less than the thickness of P1Pa, and a CoFe alloy capping layer (P1C) on P1Pb and having a magnetic flux density at least 0.8 Tesla greater than the magnetic flux density of P1Pa, P1Pa, P1Pb and P1C forming a first pole tip and having a surface disk-facing surface; (b) a second ferromagnetic pole piece over the first pole piece and having a second pole tip having a surface substantially coplanar with said first pole tip surface; (c) an electrically conductive coil structure between the first and second pole pieces; and (d) a nonmagnetic gap layer between the first and second pole tips and having a front edge substantially coplanar with said first and second pole tip surfaces; and a protective film comprising carbon formed on the disk-facing surface of the slider and having a thickness less than about 5 nm.

2. The write head structure of claim 1 wherein the combined thickness of P1Pa and P1Pb is P1PT and P1Pb has a thickness greater than about 10 percent of P1PT.

3. The write head structure of claim 1 wherein P1C includes an extension, the gap layer being formed on the P1C extension; wherein the P1C extension at the first pole tip surface, the front edge of the gap layer, and the second pole tip surface together have a track width (TW) dimension in a direction generally parallel to the substrate; wherein P1P has a width (P1PW) in a direction parallel to TW; and wherein the ratio P1PW/TW is less than about 50.

* * * * *

UNITED STATES PATENT AND TRADEMARK OFFICE
CERTIFICATE OF CORRECTION

PATENT NO. : 7,339,763 B2
APPLICATION NO. : 11/073267
DATED : March 4, 2008
INVENTOR(S) : Eric Wayne Flint et al.

It is certified that error appears in the above-identified patent and that said Letters Patent is hereby corrected as shown below:

In column 5, line 20, insert after the first occurrence of the word "surface" and before the word "disk-facing", the words --substantially coplanar with the slider's--.

Signed and Sealed this

Twenty-seventh Day of May, 2008

JON W. DUDAS
*Director of the United States Patent and Trademark Office*